(12) United States Patent
Wu et al.

(10) Patent No.: US 12,245,205 B2
(45) Date of Patent: Mar. 4, 2025

(54) CONFIGURING LOCATION INFORMATION FOR TRANSMITTING PACKETS VIA ASSISTING NODES

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Fairless Hills, PA (US); Navid Abedini, Basking Ridge, NJ (US); Anantharaman Balasubramanian, San Diego, CA (US); Sourjya Dutta, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 17/469,517

(22) Filed: Sep. 8, 2021

(65) Prior Publication Data
US 2023/0075115 A1 Mar. 9, 2023

(51) Int. Cl.
*H04W 72/0446* (2023.01)
*H04B 7/155* (2006.01)
(Continued)

(52) U.S. Cl.
CPC ........ *H04W 72/0446* (2013.01); *H04B 7/155* (2013.01); *H04W 72/40* (2023.01); *H04W 72/51* (2023.01)

(58) Field of Classification Search
CPC ... H04B 7/145; H04B 7/155; H04W 72/0446; H04W 72/40; H04W 72/51
See application file for complete search history.

(56) References Cited

U.S. PATENT DOCUMENTS

| 11,317,415 B2 * | 4/2022 | Khoryaev | ............. H04W 72/51 |
| 2010/0214973 A1 * | 8/2010 | Lim | ...................... H04W 76/10 370/315 |

(Continued)

FOREIGN PATENT DOCUMENTS

| WO | WO-2022133958 A1 * | 6/2022 |
| WO | WO-2022208824 A1 * | 10/2022 |

(Continued)

OTHER PUBLICATIONS

Chen et al., "Reconfigurable Intelligent Surface Assisted Device-to-Device Communications", IEEE Transactions on Wireless Communications, vol. 20, No. 5, May 2021, pp. 2792-2804 (Year: 2021).*

*Primary Examiner* — Shah M Rahman
(74) *Attorney, Agent, or Firm* — Holland & Hart LLP

(57) ABSTRACT

Methods, systems, and devices for wireless communications are described. For instance, a first user equipment (UE) may identify a configuration for an assisting node (AN) that includes an indication of a set of time resources during which the AN is active and an indication of location information that indicates communication direction information corresponding to communications via the AN during the set of time resources. The first UE may select a time resource from the set of time resources based on the indication of location information, a location of the first UE, and information associated with a packet for transmission from the first UE to a second UE via the assisting node. The first UE may transmit the packet over the selected time resource.

27 Claims, 11 Drawing Sheets

(51) Int. Cl.
*H04W 72/40* (2023.01)
*H04W 72/51* (2023.01)

(56) References Cited

U.S. PATENT DOCUMENTS

| | | | |
|---|---|---|---|
| 2019/0132784 A1* | 5/2019 | Thubert | H04W 72/044 |
| 2020/0154355 A1* | 5/2020 | Nam | H04W 52/0216 |
| 2021/0045093 A1* | 2/2021 | Rao | H04W 36/0009 |
| 2021/0219268 A1* | 7/2021 | Li | H04W 72/20 |
| 2021/0384958 A1* | 12/2021 | Denis | H04B 7/145 |
| 2022/0014935 A1* | 1/2022 | Haija | H04L 5/0048 |
| 2022/0052764 A1* | 2/2022 | Medra | H04B 10/541 |
| 2022/0279393 A1* | 9/2022 | Di Girolamo | H04W 36/0088 |
| 2022/0353815 A1* | 11/2022 | Lin | H04W 52/0232 |
| 2023/0030324 A1* | 2/2023 | Ali | H04B 7/0617 |
| 2023/0208479 A1* | 6/2023 | Wang | H04B 7/0617 |
| | | | 375/262 |
| 2023/0208486 A1* | 6/2023 | Dai | H04B 7/04013 |
| | | | 370/315 |
| 2023/0300713 A1* | 9/2023 | Hoang | H04L 67/51 |
| | | | 370/254 |
| 2023/0327714 A1* | 10/2023 | Baligh | H04B 7/088 |
| | | | 375/262 |
| 2024/0014860 A1* | 1/2024 | Wang | H04B 7/026 |
| 2024/0022927 A1* | 1/2024 | Tong | H04W 4/40 |
| 2024/0073882 A1* | 2/2024 | Yang | H04L 5/0048 |
| 2024/0128999 A1* | 4/2024 | Haustein | H04B 7/04013 |

FOREIGN PATENT DOCUMENTS

| | | | | |
|---|---|---|---|---|
| WO | WO-2022241703 A1 | * | 11/2022 | |
| WO | WO-2023000287 A1 | * | 1/2023 | H04B 7/04013 |

* cited by examiner

CONFIGURING LOCATION INFORMATION FOR TRANSMITTING PACKETS VIA ASSISTING NODES

FIELD OF TECHNOLOGY

The following relates to wireless communications, including configuring location information for transmitting packets via assisting nodes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may perform sidelink communications with another UE. For instance, the UE may communicate signaling with the other UE. Methods that reduce power consumption by the UEs and/or increases an energy at which a UE receives a transmission may improve the efficiency of wireless communications.

SUMMARY

The described techniques relate to improved methods, systems, devices, and apparatuses that support configuring location information for transmitting packets via assisting nodes. Generally, the described techniques provide for a user equipment (UE) to avoid communicating with assisting nodes that are deactivated and/or that are directed away from the UE and/or another UE with which the UE is to communicate. For instance, a first UE may identify a configuration for an assisting node (AN) that includes an indication of a set of time resources during which the AN is active and an indication of location information that indicates communication direction information corresponding to communications via the AN during the set of time resources. The first UE may select a time resource from the set of time resources based on the indication of location information, a location of the first UE, and information associated with a packet for transmission from the first UE to a second UE via the assisting node. The first UE may transmit the packet over the selected time resource.

A method for wireless communication at a first user equipment (UE) is described. The method may include identifying a configuration for an assisting node that includes an indication of a set of time resources during which the assisting node is active and an indication of location information that indicates communication direction information corresponding to communications via the assisting node during the set of time resources, selecting a time resource from the set of time resources based on the indication of location information, a location of the first UE, and information associated with a packet for transmission from the first UE to a second UE via the assisting node, and transmitting the packet over the selected time resource.

An apparatus for wireless communication at a first UE is described. The apparatus may include a processor, memory coupled with the processor, and instructions stored in the memory. The instructions may be executable by the processor to cause the apparatus to identify a configuration for an assisting node that includes an indication of a set of time resources during which the assisting node is active and an indication of location information that indicates communication direction information corresponding to communications via the assisting node during the set of time resources, select a time resource from the set of time resources based on the indication of location information, a location of the first UE, and information associated with a packet for transmission from the first UE to a second UE via the assisting node, and transmit the packet over the selected time resource.

Another apparatus for wireless communication at a first UE is described. The apparatus may include means for identifying a configuration for an assisting node that includes an indication of a set of time resources during which the assisting node is active and an indication of location information that indicates communication direction information corresponding to communications via the assisting node during the set of time resources, means for selecting a time resource from the set of time resources based on the indication of location information, a location of the first UE, and information associated with a packet for transmission from the first UE to a second UE via the assisting node, and means for transmitting the packet over the selected time resource.

A non-transitory computer-readable medium storing code for wireless communication at a first UE is described. The code may include instructions executable by a processor to identify a configuration for an assisting node that includes an indication of a set of time resources during which the assisting node is active and an indication of location information that indicates communication direction information corresponding to communications via the assisting node during the set of time resources, select a time resource from the set of time resources based on the indication of location information, a location of the first UE, and information associated with a packet for transmission from the first UE to a second UE via the assisting node, and transmit the packet over the selected time resource.

In some examples of the method, apparatuses, and non-transitory computer-readable medium described herein, identifying the indication of location information may include operations, features, means, or instructions for identifying a first zone relative to the assisting node and a second zone relative to the assisting node, where the first UE may be associated with the first zone and the second UE may be associated with the second zone.

In some examples of the method, apparatuses, and non-transitory computer-readable medium described herein, identifying the indication of location information may include operations, features, means, or instructions for identifying an incoming signal direction to the assisting node and an outgoing signal direction from the assisting node, where the first UE may be associated with the incoming signal direction and the second UE may be associated with the outgoing signaling direction.

In some examples of the method, apparatuses, and non-transitory computer-readable medium described herein, identifying the indication of location information may include operations, features, means, or instructions for identifying a first pair of incoming and outgoing signal directions associated with the assisting node corresponding to a first subset of time resources of the set of time resources and identifying a second pair of incoming and outgoing signal directions associated with the assisting node corresponding to a second subset of time resources of the set of time resources.

In some examples of the method, apparatuses, and non-transitory computer-readable medium described herein, selecting the time resource from the set of time resources may include operations, features, means, or instructions for selecting between the first subset of time resources and the second subset of time resources based on the information associated with the packet for transmission from the first UE to the second UE, the first pair of incoming and outgoing signal directions, and the second pair of incoming and outgoing signal directions.

Some examples of the method, apparatuses, and non-transitory computer-readable medium described herein may further include operations, features, means, or instructions for receiving the configuration from a controller of the assisting node, where identifying the configuration may be based on receiving the configuration.

Some examples of the method, apparatuses, and non-transitory computer-readable medium described herein may further include operations, features, means, or instructions for transmitting, to the controller of the assisting node, a request for the configuration, where receiving the configuration may be based on transmitting the request.

In some examples of the method, apparatuses, and non-transitory computer-readable medium described herein, receiving the configuration may include operations, features, means, or instructions for receiving a sidelink resource pool configuration, where the sidelink resource pool configuration indicates the set of time resources during which the assisting node may be active and the location information that indicates communication direction information corresponding to communications via the assisting node during the set of time resources.

Some examples of the method, apparatuses, and non-transitory computer-readable medium described herein may further include operations, features, means, or instructions for receiving the configuration via radio resource control (RRC) signaling, medium access control (MAC) control element signaling, sidelink control information signaling, or any combination thereof.

In some examples of the method, apparatuses, and non-transitory computer-readable medium described herein, the information associated with the packet for transmission from the first UE to the second UE includes at least a location of the second UE and the method, apparatuses, and non-transitory computer-readable medium may include further operations, features, means, or instructions for determining to communicate with the second UE via the assisting node based on the location of the second UE, the location of the first UE, and the communication direction information corresponding to communications via the assisting node during the set of time resources.

In some examples of the method, apparatuses, and non-transitory computer-readable medium described herein, the selecting the time resource from the set of time resources may be based on the determining to communicate with the second UE via the assisting node.

In some examples of the method, apparatuses, and non-transitory computer-readable medium described herein, the set of time resources includes a set of slots during which the assisting node may be active and the time resource includes one slot of the set of slots.

In some examples of the method, apparatuses, and non-transitory computer-readable medium described herein, the assisting node includes a reconfigurable surface or a repeater.

DETAILED DESCRIPTION

An assisting node (AN) may be deployed to assist in sidelink communication. For instance, the AN may be configured to receive a transmission from a first UE and to direct the transmission (e.g., via retransmitting, reflecting, refracting) to a second UE. In some examples, the AN may be a repeater configured to repeat a received signal from the first UE and to transmit the received signal to a second UE. In other examples, the AN may be a reconfigurable intelligent surface (RIS) configured to reflect a received signal from the first UE to the second UE. In some examples, a UE (e.g., a UE on a vehicle) may lack a capability to control the AN. Accordingly, if the UE fails to identify a configuration of the AN, the UE may fail to account for changes that occur at the AN.

A UE may identify a configuration of an AN. For instance, in order to enable communication between UEs, a controller of the AN may transmit, to a UE, location information and a set of time resources corresponding to the location information. The set of time resources, for instance, may correspond to multiple slots, where each slot may be associated with a respective incoming transmission direction and a respective outgoing transmission direction relative to the assisting node. In some examples, the incoming transmission direction may be associated with a first zone and the outgoing transmission direction may be associated with a second zone. Accordingly, the UE may select the slot in which the AN is configured to transmit in the outgoing direction that points toward a second UE with which the UE is to communicate.

Aspects of the disclosure are initially described in the context of wireless communications systems. Additional aspects of the disclosure are described in the context of a assisting node configuration and a process flow. Aspects of the disclosure are further illustrated by and described with reference to apparatus diagrams, system diagrams, and flowcharts that relate to configuring location information for transmitting packets via assisting nodes.

Figure 1:
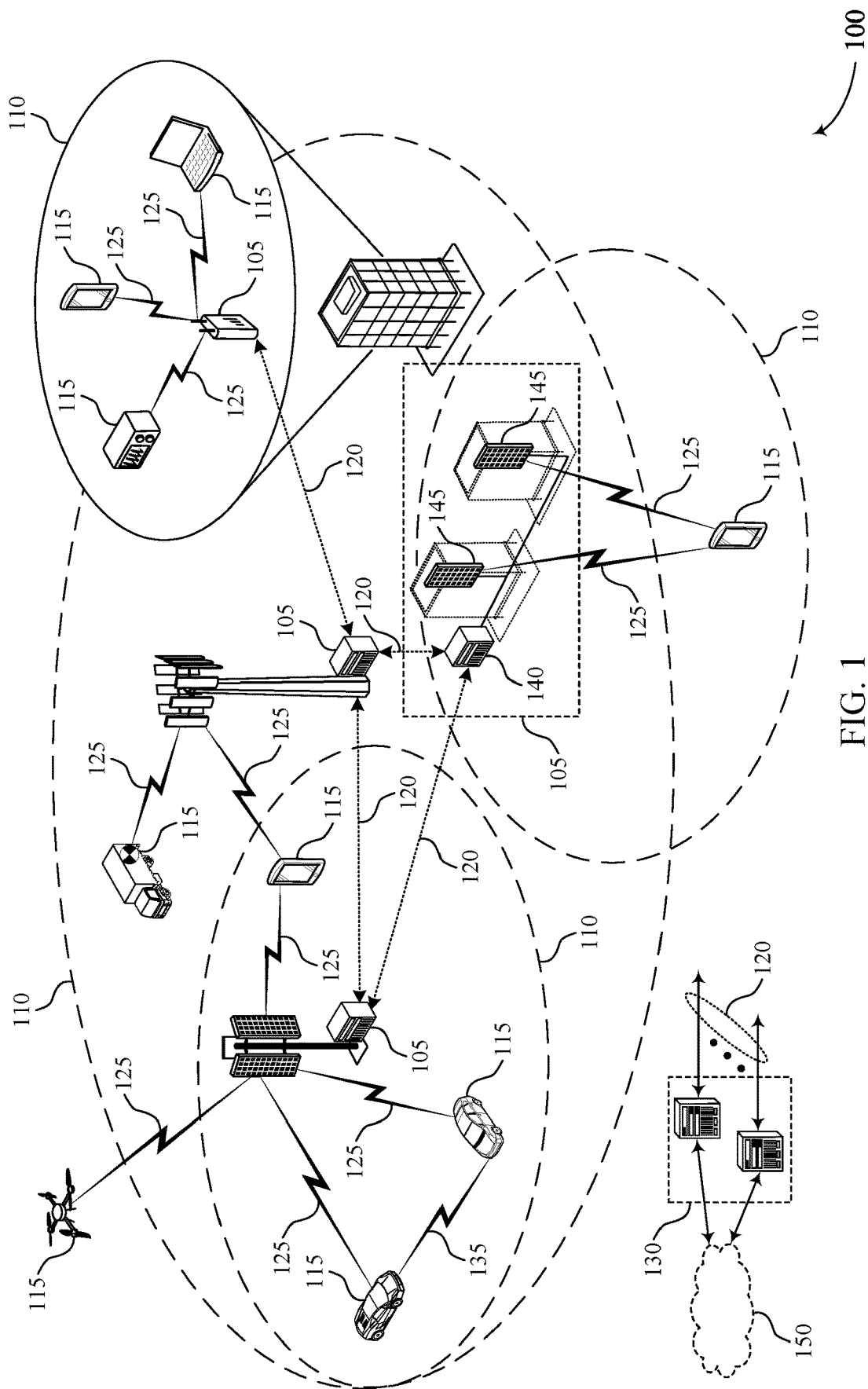
FIG. 1 illustrates an example of a wireless communications system that supports configuring location information for transmitting packets via assisting nodes in accordance with aspects of the present disclosure.

FIG. 1 illustrates an example of a wireless communications system 100 that supports configuring location information for transmitting packets via assisting nodes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, UEs 115 may perform sidelink communication and/or vehicle to everything (V2X) communication (e.g., if coupled with a vehicle). In some examples, UEs 115 performing V2X and/or sidelink communication may use one or more modes of resource allocation. For instance, in a first mode (i.e., Mode 1), a base station 105 may allocate one or more resources to a transmitting UE 115 for a sidelink data channel transmission. In a second mode (i.e., Mode 2), the transmitting UE 115 may perform resource allocation without assistance from a base station 105. In some examples, Mode 2 may support reservation-based scheduling. For instance, a transmitting UE 115 may reserve a number of resources in a number of slots (e.g., future slots) for transmissions (e.g., future transmissions). The reservation may be indicated in sidelink control information (SCI) and the UE 115 may make the reservation based on monitoring sidelink transmissions from other UEs 115.

In some examples of Mode 2 resource allocation, a UE 115 may identify available resources in a resource selection window. The UE 115 may select resources from available resources in the resource selection window (e.g., the UE 115 may randomly select among the available resources). When transmitting in a selected resource, the UE 115 may reserve a number of resources that have been reserved for transmissions (e.g., retransmissions) from the UE 115. In some examples, reservation signaling may be carried in SCI. In some examples, the identification of available resources is based on V2X sensing. For instance, the UE 115 may monitor and/or decode sidelink transmissions from other UEs 115 in the sidelink resource pool. The decoded reservation information and/or reference signal received power (RSRP) measured while decoding may indicate whether a resource is available. For instance, the resource may not be available if the resource is reserved and/or if measured RSRP associated with the resource is greater than an RSRP threshold.

One type of AN, for instance, may be an RIS. The RIS may be a phase array without a transceiver and, in some examples may include a metamaterial. The RIS may reflect signals (e.g., phase shifting control may be integrated in the back of the antenna panel). In some examples, a RIS may be referred to as a reflection intelligent surface. Using a RIS may improve network coverage and/or throughput and may reduce power consumption. For instance, the RIS may reflect signals towards a coverage hole (e.g., an area with reduced coverage) and/or to an area with a lower power constraint than other areas. In some examples, the RIS may have a controller and one or more antenna arrays. The controller may control the antenna array to receive and/or reflect signals towards an indicated direction. The controller may be able to communicate with other nodes, such as a base station 105. Another type of AN, for instance, may be a repeater (e.g., a smart repeater). The repeater may amplify a received signal and may forward it. Additionally, the repeater may be able to control a receiving beam direction and/or forwarding beam direction. Both the RIS and the repeater may be capable of extending signal coverage.

An AN may be deployed to assist in sidelink communication. For instance, the AN may be configured to receive a transmission from a first UE 115 and to direct the transmission (e.g., via retransmitting, reflecting, refracting) to a second UE 115. In some examples, a UE 115 (e.g., a UE 115 on a vehicle) may lack a capability to control the AN. Accordingly, if the UE 115 fails to identify a configuration of the AN, the UE 115 may fail to account for changes that occur at the AN. The present disclosure may be directed to methods that enable a UE 115 to identify a configuration of an AN. For instance, in order to enable communication between UEs 115, a controller of the AN may transmit, to a UE 115, location information and a set of time resources corresponding to the location information. The set of time resources, for instance, may correspond to multiple slots, where each slot may be associated with a respective incoming transmission direction and a respective outgoing transmission direction relative to the assisting node. In some examples, the incoming transmission direction may be associated with a first zone and the outgoing transmission direction may be associated with a second zone. Accordingly, the UE 115 may select the slot in which the AN is configured to transmit in the outgoing direction that points toward a second UE 115 with which the UE 115 is to communicate.

Figure 2A:
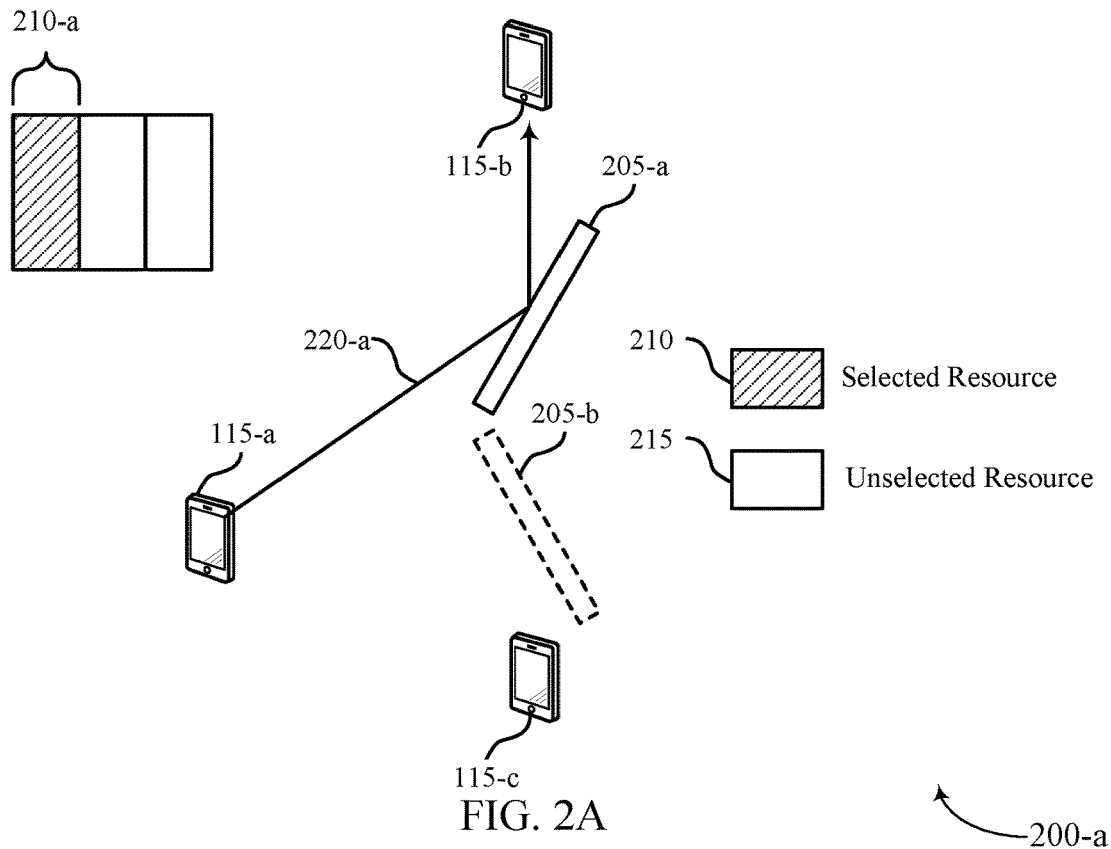
FIGS. 2A-2B illustrate an example of a wireless communications system that supports configuring location information for transmitting packets via assisting nodes in accordance with aspects of the present disclosure.
Figure 2B:
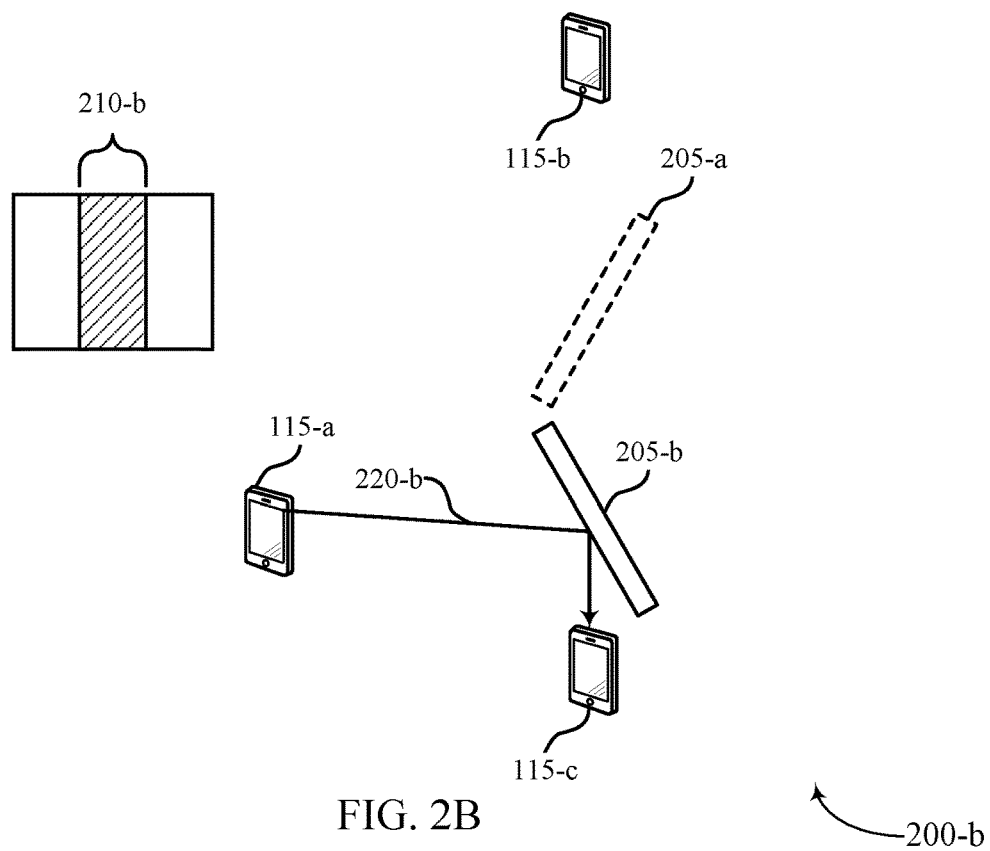

FIGS. 2A-2B illustrate an example of a wireless communications system 200-a and 200-b that supports configuring location information for transmitting packets via assisting nodes in accordance with aspects of the present disclosure.

In some examples, wireless communications systems 200-a and 200-b may be implemented by one or more aspects of wireless communications system 100. For instance, UEs 115-a, 115-b, and 115-c may be examples of UEs 115 as described with reference to FIG. 1.

Generally, AN 205-a may facilitate communication between UE 115-a and UE 115-b. Likewise, AN 205-b may facilitate communication between UE 115-a and UE 115-c. In some examples, ANs 205-a and 205-b may each be an example of a RIS or a repeater as described herein. In some examples, ANs 205-a and 205-b may be part of an AN that includes a controller coupled with ANs 205-a and 205-b. Wireless communication system 200-a may illustrate a transmission from UE 115-a when an AN including ANs 205-a and 205-b is in a first configuration and wireless communication system 200-b may illustrate a transmission from UE 115-a when the AN including ANs 205-a and 205-b is in a second configuration.

In some examples, ANs 205 may assist sidelink and/or V2X communication. The AN 205 may be deployed to improved sidelink communication performance and/or to assist communications between UE 115-a and a base station 105 but used for sidelink when available (e.g., when a part of resources are configured for sidelink communication and within those resources are no transmissions between the base station 105 and UE 115-a). In some examples, the AN 205 may be used for sidelink in the configured sidelink resources. However, in some examples, the scheduler of a transmission may not have control over the AN 205. For instance, in Mode 2 resource allocation, UE 115-a (e.g., which may perform V2X communications) may schedule transmissions but may not be configured to control the AN 205. In order to enable UE 115-a to communicate without being able to control the AN 205, UE 115-a may leverage location information. For instance, V2X communications may be location dependent. Accordingly, methods that use a location dependent framework for AN-assisted sidelink may enable UE 115-a to communicate with other UEs 115.

In some examples, an AN 205 may be co-located with a roadside unit (RSU). For instance, the AN 205 may be stationary and co-located with an RSU at an intersection. In other examples, the AN 205 may be deployed stand-alone, but may have a sidelink and/or V2X transceiver capable of performing sidelink and/or V2X communications, respectively. In some examples, the AN 205 may be controlled by a controller. For instance, the controller may be the co-located RSU or another entity (e.g., integrated or co-located with the AN 205). In some examples, the controller may be configured to activate (e.g., turn on) or deactivate (e.g., turn off) the AN and/or may be configured to change the incident signal direction (or receiving beam direction) for an incoming signal and/or reflected signal direction (e.g., or transmitting beam direction) for an outgoing signal.

In some examples, ANs 205-a and 205-b may be deployed at an intersection. Each AN 205-a and 205-b may be turned on in one or more slots and, for each slot for which ANs 205-a and 205-b are turned on, one or more particular incoming and outgoing signal directions may be associated with them. For instance, in a first slot 210-a, AN 205-a may be activated and may be configured to communicate signals coming from a direction of UE 115-a towards a direction of UE 115-b and/or vice-versa. During the first slot 210-a, AN 205-b may be deactivated. Similarly, in a second slot 210-b, AN 205-b may be activated and may be configured to communicate signals coming from a direction of UE 115-a towards a direction of UE 115-c and/or vice-versa. During the second slot 210-b, AN 205-a may be deactivated.

When UE 115-*a* has a packet arrive from an application layer, UE 115-*a* may determine, based on the information associated with the packet, whether to use AN 205-*a* and/or AN 205-*b* (e.g., based on range constraints, direction). In such examples, UE 115-*a* may select resources from corresponding slots 210 (e.g., the slots for which an AN 205 is activated) that are associated with an incoming and outgoing signal directions that enable UE 115-*a* to communicate with a UE 115 that is to receive the packet (e.g., UE 115-*b* or UE 115-*c*). For instance, if UE 115-*a* determines, from the packet, that UE 115-*a* is to transmit the packet to UE 115-*b*, UE 115-*a* may select slot 210-*a* (e.g., and may refrain from selecting the remaining slots 215), as AN 205-*a* may be configured to direct transmissions of UE 115-*a* toward UE 115-*b* during slot 210-*a*. In such examples, UE 115-*b* may communicate a transmission 220-*a* including the packet to AN 205-*a*. However, if UE 115-*a* determines, from the packet, that UE 115-*a* is to transmit the packets to UE 115-*c*, UE 115-*c* may select slot 210-*b* (e.g., and may refrain from selecting the remaining slots 215), as AN 205-*b* may be configured to direct transmission of UE 115-*a* towards UE 115-*c* during slot 210-*b*. In such examples, UE 115-*b* may communicate a transmission 220-*b* including the packet to AN 205-*b*.

For a V2X UE 115 (e.g., UE 115-*a*) to transmit on sidelink, the UE 115 may acquire an AN configuration (e.g., a configuration of ANs 205-*a* and 205-*b*). The AN configuration ay indicate at least the resources (e.g., slots) that the AN 205 is to be activated for and location information associated with incoming signal and outgoing signal directions. The UE 115 may receive a sidelink data packet from a V2X application layer (e.g., the data packet may have associated information that may be used to determine whether AN assistance is to be used). The UE 115 may determine a subset of resources based on the AN configuration and the packet and the UE 115 may select resources from the subset of the resources to transmit the packet. Additional examples may be described herein, for instance, with reference to FIG. 3.

In some examples, a configuration of an AN 205 may indicate the time resources for which the AN 205 is to be activated. For instance, the AN 205 may have a pair of incoming and outgoing signal directions and the configuration may indicate the slots that AN 205 is to be activated. When the AN 205 is activated, the AN 205 may reflect and/or forward signals from the incoming direction towards the outgoing direction. In other examples, the AN 205 may have more than one pair of incoming and outgoing signal directions, the configuration may indicate the slots that the AN 205 may be activated for, and may indicate corresponding incoming and outgoing signal directions for each slot that the AN 205 may be activated. In some examples, the incoming and outgoing directions may be mapped to or represented by locations (e.g., zones). For instance, the incoming signal direction may be zone A (e.g., a zone including UE 115-*a*) and the outgoing signal direction may be zone B (e.g., a zone including UE 115-*b*) or zone C (e.g., a location including UE 115-*c*).

In some examples, UE 115-*a* may receive the AN configuration according to one or more schemes. For instance, in a first scheme (e.g., a static scheme), the AN setup may be static and the configuration may be configured and/or pre-configured at UE 115-*a*. For instance, the AN configuration may be pre-configured as part of the resource pool configuration. The resource pool configuration may specify a time and/frequency resource location of the resource pool (e.g., the AN configuration may be part of the resource pool configuration. In one example, for slots within the resource pool, a first AN 205 may have the bitmap 1100011000, a second AN 205 may have the slot bitmap 00111011, where the signal direction of the first AN 205 points from zone A to zone B and the signal direction of the second AN 205 points from zone B to zone C. In some examples, the specification of the zone may be pre-configured. For instance, based on the deployment of the AN 205, the regions (e.g., roads) around the AN 205 may be partitioned into four zones. An additional example may be described herein, for instance, with reference to FIG. 3. In some examples, the AN configuration may be signaled by a controller of the AN (e.g., broadcasted over sidelink as RRC signaling). Accordingly, UEs 115 that receive the signal from the controller of the AN may identify the presence of an AN and its configuration.

In a second scheme (e.g., a semi-static scheme), the AN configuration may be controlled by a controller of the AN 205. For example, the controller may be the RSU (e.g., if the AN 205 is coupled or co-located with the RSU) or an integrated controller. In some examples, the controller may be sidelink-capable and may send the AN configuration over sidelink. In some examples, the AN configuration may be broadcasted by the controller (e.g., via RRC signaling). For example, the AN controller may periodically broadcast the AN configuration, where the broadcasted transmission of the AN configuration is transmitted in a pre-determined resources. In another example, the AN configuration may be transmitted based upon a request (e.g., from UE 115-*a*). For instance, a UE 115 may discover the AN 205 and may transmit a request for the AN configuration. In some examples, AN configuration and/or reconfiguration may be performed by the controller. For example, based on traffic pattern, sidelink resource pool congestion level, or V2X sensing, the controller may determine to turn on and/or activate the AN 205 for longer or shorter times (e.g., turning on the AN 205 for longer times for certain incoming and/or outgoing directions as compared to other incoming and/or outgoing directions.

In a third scheme (e.g., a dynamic scheme), the AN configuration may be controlled by a controller, where the signaling of the AN configuration is in a dynamic manner. For instance, the AN configuration may be transmitted in SCI or a medium access control (MAC) control element (MAC-CE). In some such examples, the AN controller may transmit a dedicated SCI to indicate the slots that the AN 205 may be activated (e.g., a type of resource reservation). Alternatively, the information may be carried in MAC-CE signaling. The configuration may indicate zones and/or locations associated with incoming and/or outgoing signal directions. In order to determine the AN configuration, the AN controller may perform V2X sensing such that the AN controller may identify resource reservation information (e.g., for periodic V2X transmissions). Based on the reservation, the AN controller may determine whether to activate an AN 205 for slots having the reservations. If so, the AN controller may determine for which incoming and/or outgoing signal directions to activate the AN 205 based on the received signal.

In some examples, a transmitting UE 115 (e.g., UE 115-*a*) may determine the subset of resources from a resource pool based on the AN configuration. For instance, the UE 115 may determine the resources and/or slots in which a location and/or zone associated with the incoming signal direction is aligned with its own location. Additionally or alternatively, the UE 115 may determine the resources and/or slots in which a location and/or zone associated with the outgoing signal direction is aligned with a location of another device (e.g., another UE 115) with which the UE 115 is to communicate and/or aligned with signal coverage identified by the UE 115. The UE 115 may also use other information. For instance, the UE 115 may use an identified communication range associated with the packet. Based on the identified communication range as well as the distance between the UE 115 and the AN 205, the UE 115 may determine whether to select resources (e.g., and what resources to select). For instance, if the packet is directed to a second UE 115 behind a first UE 115, the first UE 115 may not select resources in slots in which the AN 205 may enhance the signal towards UEs 115 in front of the first UE 115.

The methods described herein may be associated with one or more advantages. For instance, the UE 115 identifying which slots an AN 205 is activated and the incoming and outgoing signal directions associated with that slot may enable the UE 115 to avoid transmitting signals to deactivated ANs 205, to ANs 205 that have an incoming signal direction unaligned with the UE 115, to ANs 205 that have an outgoing signal direction. unaligned with another UE 115 to which the UE is to transmit, or any combination thereof. Accordingly, the efficiency of communications may improve.

Figure 3:
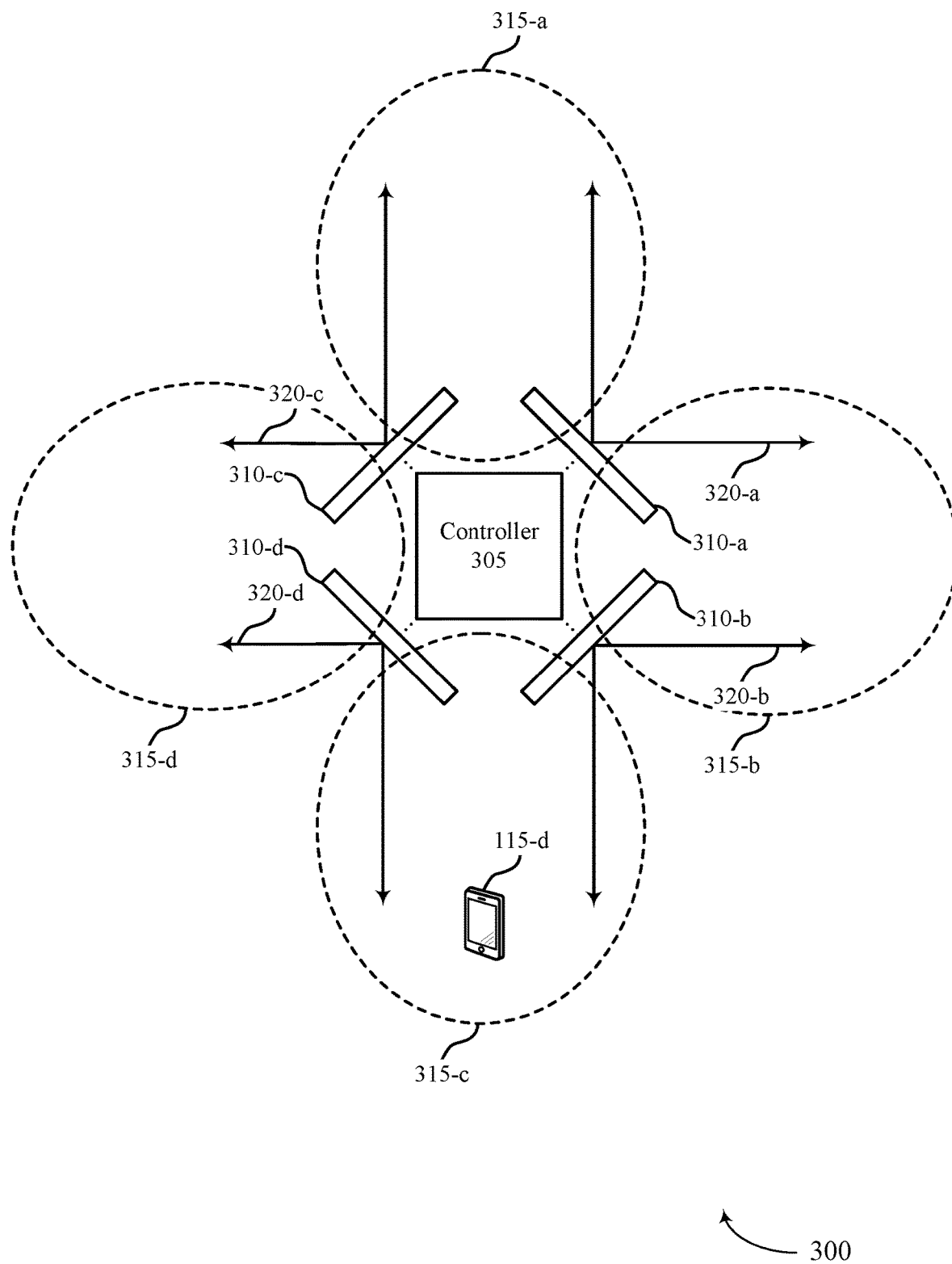
FIG. 3 illustrates an example of a assisting node configuration that supports configuring location information for transmitting packets via assisting nodes in accordance with aspects of the present disclosure.

FIG. 3 illustrates an example of an assisting node configuration 300 that supports configuring location information for transmitting packets via assisting nodes in accordance with aspects of the present disclosure. In some examples, wireless communications systems 200-a and 200-b may be implemented by one or more aspects of wireless communications systems 100 and/or 200. For instance, UE 115-d may be an example of a UE 115 as described with reference to FIG. 1. Additionally or alternatively, ANs 310-a, 310-b, 310-c, and 310-d may be examples of an AN 205 (e.g., AN 205-a and/or AN 205-b) as described with reference to FIG. 2.

The controller 305 may be coupled with ANs 310-a, 310-b, 310-c, and 310-d and may be an example of an RSU or an integrated controller. In some examples, AN 310-a may be configured to reflect and/forward transmissions along signal directions 320-a (e.g., zones 315-a and 315-b); AN 310-b may be configured to reflect and/or forward transmissions along signal directions 320-b (e.g., zones 315-b and 315-c); AN 310-c may be configured to reflect and/or forward transmissions along signal directions 320-c (e.g., zones 315-d and 315-a); and AN 310-d may be configured to reflect and/or forward transmissions along signal directions 320-d (e.g., zones 315-c and 315-d).

In an example, during a first slot n, AN 310-a may be activated; during a second slot n+1, AN 310-b may be activated; during a third slot n+2, AN 310-c may be activated; and during a fourth slot n+3, AN 310-d may be activated. Additionally, in slots n+4 and n+5, each AN 310-a, 310-b, 310-c, and 310-d may be deactivated. Although four ANs 310-a, 310-b, 310-c, and 310-d are depicted herein, there may also be examples in which a single AN 310 performs the functions of ANs 310-a, 310-b, 310-c, and 310-d. In some examples, an AN configuration may indicate that for slot n, AN 310-a may be activated and that the incoming and outgoing signal directions may each be one of zones 315-a and 315-b. Additionally or alternatively, the AN configuration may indicate that for slot n+1, AN 310-b may be activated and that the incoming and outgoing signal directions may each be one of zones 315-b and 315-c. Additionally or alternatively, the AN configuration may indicate that for slot n+2, AN 310-c may be activated and that the incoming and outgoing signal directions may each be one of zones 315-d and 315-a. Additionally or alternatively, the AN configuration may indicate that for slot n+3, AN 310-d may be activated and that the incoming and outgoing signal directions may each be one of zones 315-c and 315-d. Accordingly, for UE 115-d, which may be in zone 315-c, UE 115-d may select to communicate over slots n+1 (e.g., associated with AN 310-b) or n+3 (e.g., associated with AN 310-d).

Figure 4:
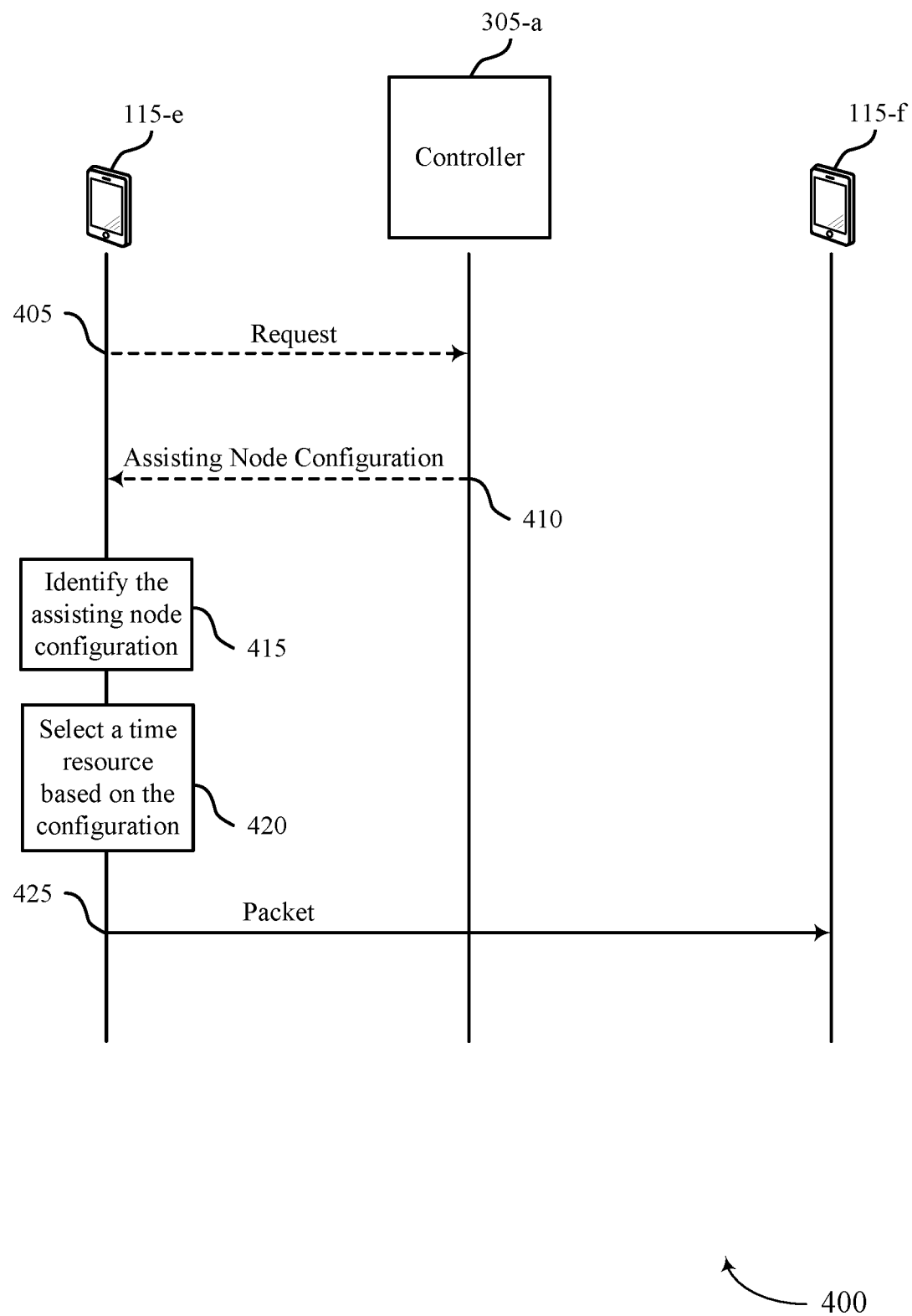
FIG. 4 illustrates an example of a process flow that supports configuring location information for transmitting packets via assisting nodes in accordance with aspects of the present disclosure.

FIG. 4 illustrates an example of a process flow 400 that supports configuring location information for transmitting packets via assisting nodes in accordance with aspects of the present disclosure. In some examples, process flow 400 may be implemented by one or more aspects of wireless communications system 100, wireless communications system 200, assisting node configuration 300, or any combination thereof. For instance, UEs 115-e and 115-f may be examples of UEs 115 as described with reference to FIG. 1. Additionally or alternatively, controller 305-a may be an example of a controller 305 as described with reference to FIG. 3.

At 405, UE 115-e may transmit, to controller 305-a of an AN, a request for a configuration for the AN that includes an indication of a set of time resources during which the AN is active and an indication of location information that includes communication direction information corresponding to communications via the assisting node during the set of time resources. In some examples, the AN may include a reconfigurable surface (e.g., a RIS) or a repeater.

At 410, the controller 305-a may transmit, to UE 115-e, the configuration of the AN. In some examples, transmitting the configuration may be based on receiving the request. In some examples, the configuration may be received via RRC signaling, MAC-CE signaling, SCI signaling, or any combination thereof. In some examples, receiving the configuration may include receiving a sidelink resource pool configuration, where the sidelink resource pool configuration indicates the set of time resources during which the AN is active and the location information that indicates communication direction information corresponding to communications via the AN during the set of time resources.

At 415, UE 115-e may identify the configuration for the AN. In some examples, identifying the indication of location information includes identifying a first zone relative to the AN and a second node relative to the AN, where UE 115-e is associated with the first zone and the UE 115-f is associated with the second zone. In some examples, identifying the indication of location information includes identifying an incoming signal direction to the AN and an outgoing signal direction from the AN, where the UE 115-e is associated with the incoming signal direction and UE 115-f is associated with the outgoing signal direction. In some examples, identifying the indication of location information includes identifying a first pair of incoming and outgoing signal directions associated with the AN corresponding to a first subset of time resources of the set of time resources and identifying a second pair of incoming and outgoing signal directions associated with the AN corresponding to a second subset of time resources of the set of time resources. In some examples, the set of time resources includes a set of slots during which the AN is active and the time resource includes one slot of the set of slots.

At 420, UE 115-e may select a time resource from the set of time resources based on the indication of location information, a location of UE 115-e, and information associated with a packet for transmission from UE 115-e to UE 115-f via the AN. In some examples, selecting the time resource may include selecting between the first subset of time resources and the second subset of time resources based on the information associated with the packet for transmission from UE 115-*e* to UE 115-*f*, the first pair of incoming and outgoing signal directions, and the second pair of incoming and outgoing signal directions. In some examples, the information associated with the packet for transmission from UE 115-*e* to UE 115-*f* includes at least a location of UE 115-*f* In some such examples, UE 115-*e* may determine to communicate with UE 115-*f* via the AN based on the location of UE 115-*f*, the location of UE 115-*e*, and the communication direction information corresponding to communication via the AN during the set of time resources. In some examples, selecting the time resource from the set of time resources is based on the determining to communicate with UE 115-*f* via the AN.

At 425, UE 115-*e* may transmit, to UE 115-*f*, the packet over the selected time resource.

Figure 5:
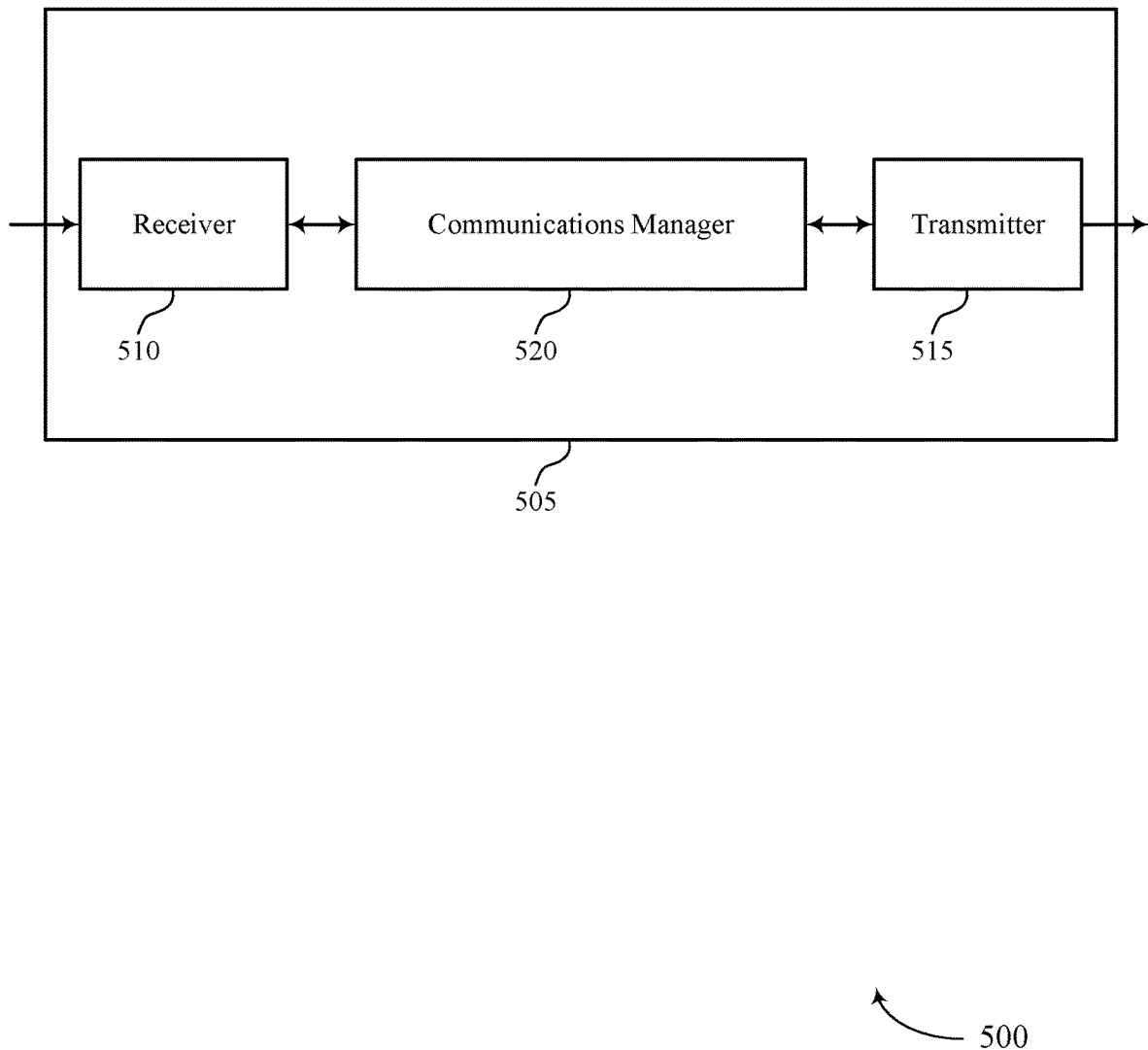
FIGS. 5 and 6 show block diagrams of devices that support configuring location information for transmitting packets via assisting nodes in accordance with aspects of the present disclosure.

FIG. 5 shows a block diagram 500 of a device 505 that supports configuring location information for transmitting packets via assisting nodes in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to configuring location information for transmitting packets via assisting nodes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to configuring location information for transmitting packets via assisting nodes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of configuring location information for transmitting packets via assisting nodes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for identifying a configuration for an assisting node that includes an indication of a set of time resources during which the assisting node is active and an indication of location information that indicates communication direction information corresponding to communications via the assisting node during the set of time resources. The communications manager 520 may be configured as or otherwise support a means for selecting a time resource from the set of time resources based on the indication of location information, a location of the first UE, and information associated with a packet for transmission from the first UE to a second UE via the assisting node. The communications manager 520 may be configured as or otherwise support a means for transmitting the packet over the selected time resource.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for identifying which slots an AN is activated and the incoming and outgoing signal directions associated with that slot. The identifying may enable the device 505 to avoid transmitting signals to deactivated ANs, to ANs that have an incoming signal direction unaligned with the device 505, to ANs that have an outgoing signal direction unaligned with a UE to which the device 505 is to transmit, or any combination thereof. Accordingly, the efficiency of communications may improve.

Figure 6:
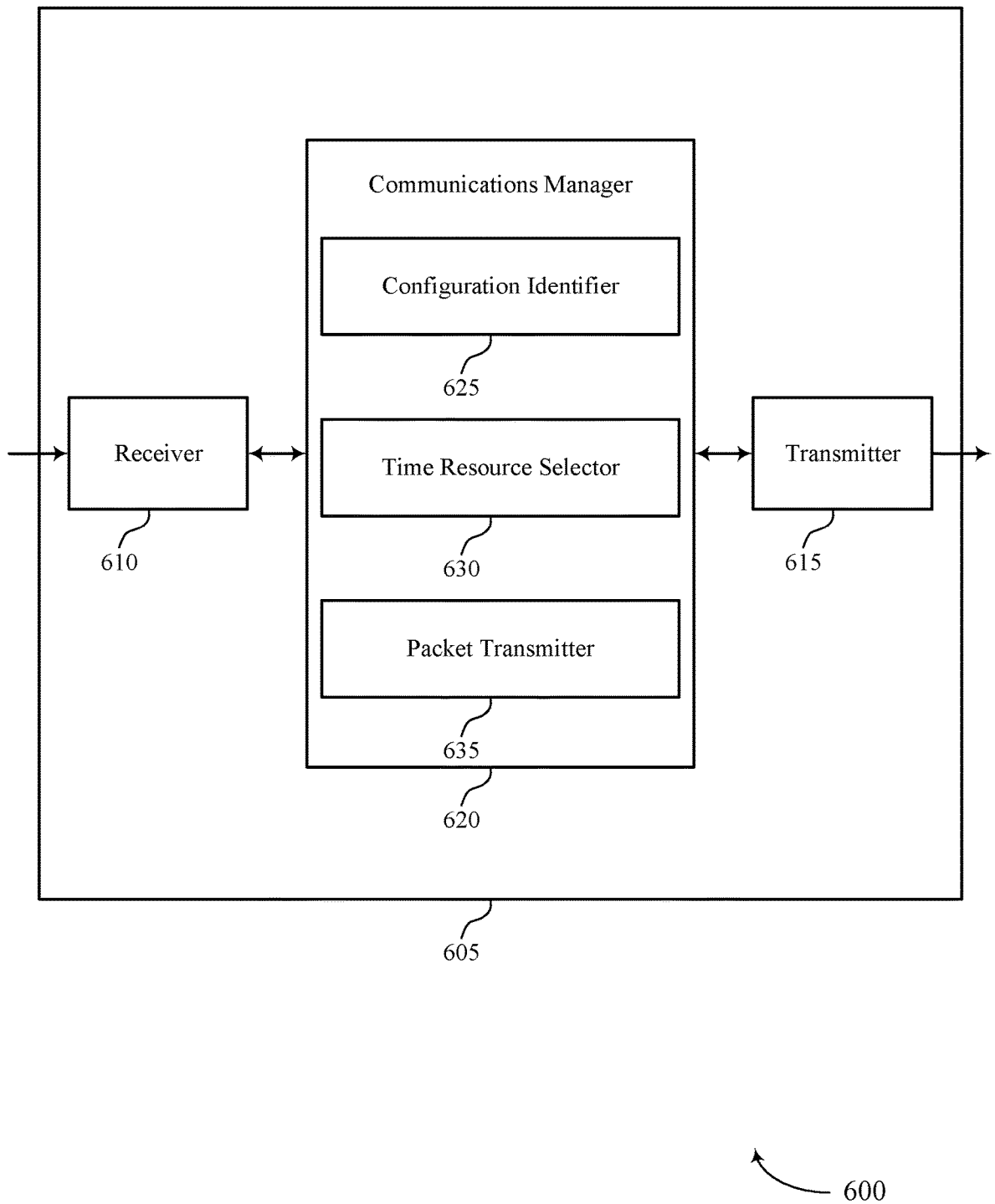

FIG. 6 shows a block diagram 600 of a device 605 that supports configuring location information for transmitting packets via assisting nodes in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to configuring location information for transmitting packets via assisting nodes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to configuring location information for transmitting packets via assisting nodes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of configuring location information for transmitting packets via assisting nodes as described herein. For example, the communications manager 620 may include a configuration identifier 625, a time resource selector 630, a packet transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The configuration identifier 625 may be configured as or otherwise support a means for identifying a configuration for an assisting node that includes an indication of a set of time resources during which the assisting node is active and an indication of location information that indicates communication direction information corresponding to communications via the assisting node during the set of time resources. The time resource selector 630 may be configured as or otherwise support a means for selecting a time resource from the set of time resources based on the indication of location information, a location of the first UE, and information associated with a packet for transmission from the first UE to a second UE via the assisting node. The packet transmitter 635 may be configured as or otherwise support a means for transmitting the packet over the selected time resource.

Figure 7:
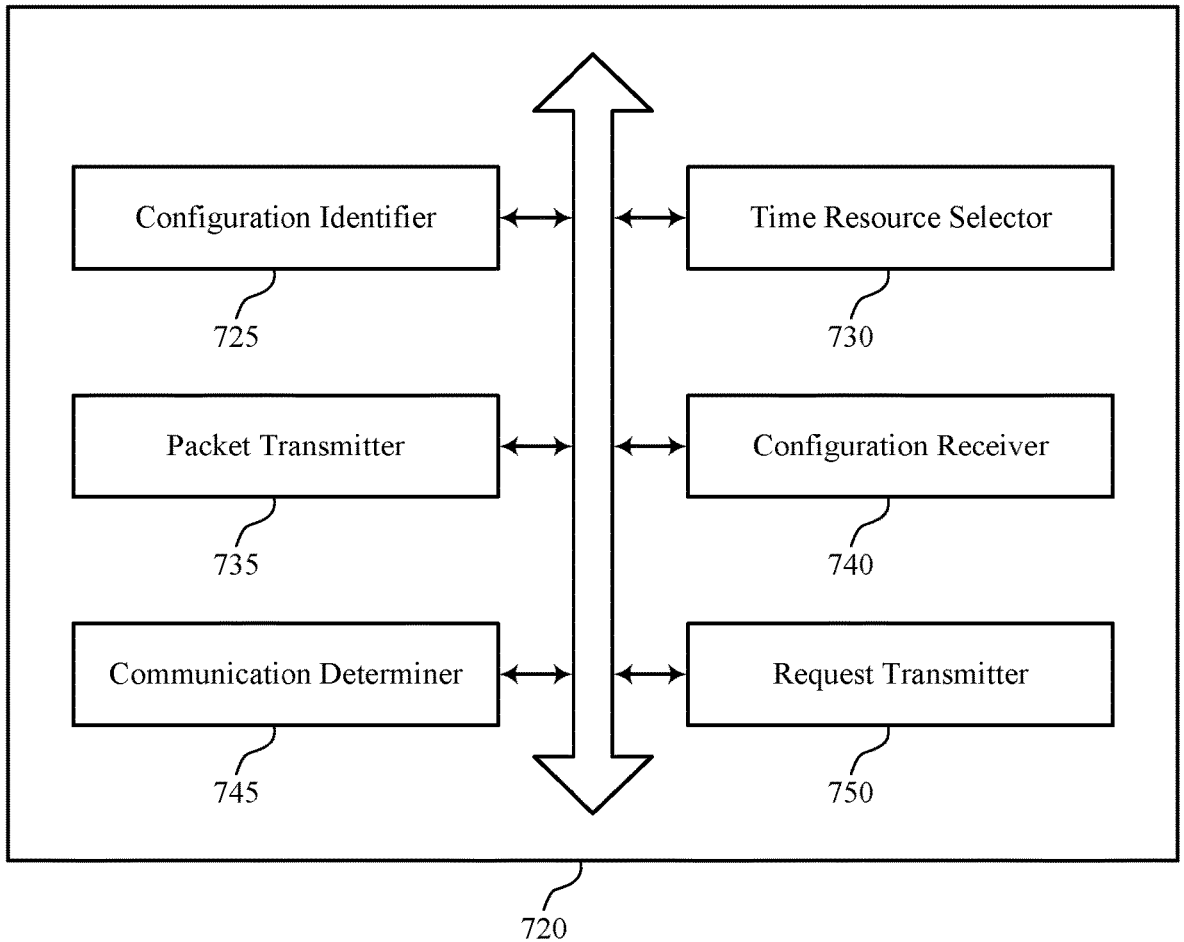
FIG. 7 shows a block diagram of a communications manager that supports configuring location information for transmitting packets via assisting nodes in accordance with aspects of the present disclosure.

FIG. 7 shows a block diagram 700 of a communications manager 720 that supports configuring location information for transmitting packets via assisting nodes in accordance with aspects of the present disclosure. The communications manager 720 may be an example of aspects of a communications manager 520, a communications manager 620, or both, as described herein. The communications manager 720, or various components thereof, may be an example of means for performing various aspects of configuring location information for transmitting packets via assisting nodes as described herein. For example, the communications manager 720 may include a configuration identifier 725, a time resource selector 730, a packet transmitter 735, a configuration receiver 740, a communication determiner 745, a request transmitter 750, or any combination thereof. Each of these components may communicate, directly or indirectly, with one another (e.g., via one or more buses).

The communications manager 720 may support wireless communication at a first UE in accordance with examples as disclosed herein. The configuration identifier 725 may be configured as or otherwise support a means for identifying a configuration for an assisting node that includes an indication of a set of time resources during which the assisting node is active and an indication of location information that indicates communication direction information corresponding to communications via the assisting node during the set of time resources. The time resource selector 730 may be configured as or otherwise support a means for selecting a time resource from the set of time resources based on the indication of location information, a location of the first UE, and information associated with a packet for transmission from the first UE to a second UE via the assisting node. The packet transmitter 735 may be configured as or otherwise support a means for transmitting the packet over the selected time resource.

In some examples, to support identifying the indication of location information, the configuration identifier 725 may be configured as or otherwise support a means for identifying a first zone relative to the assisting node and a second zone relative to the assisting node, where the first UE is associated with the first zone and the second UE is associated with the second zone.

In some examples, to support identifying the indication of location information, the configuration identifier 725 may be configured as or otherwise support a means for identifying an incoming signal direction to the assisting node and an outgoing signal direction from the assisting node, where the first UE is associated with the incoming signal direction and the second UE is associated with the outgoing signaling direction.

In some examples, to support identifying the indication of location information, the configuration identifier 725 may be configured as or otherwise support a means for identifying a first pair of incoming and outgoing signal directions associated with the assisting node corresponding to a first subset of time resources of the set of time resources. In some examples, to support identifying the indication of location information, the configuration identifier 725 may be configured as or otherwise support a means for identifying a second pair of incoming and outgoing signal directions associated with the assisting node corresponding to a second subset of time resources of the set of time resources.

In some examples, to support selecting the time resource from the set of time resources, the time resource selector 730 may be configured as or otherwise support a means for selecting between the first subset of time resources and the second subset of time resources based on the information associated with the packet for transmission from the first UE to the second UE, the first pair of incoming and outgoing signal directions, and the second pair of incoming and outgoing signal directions.

In some examples, the configuration receiver 740 may be configured as or otherwise support a means for receiving the configuration from a controller of the assisting node, where identifying the configuration is based on receiving the configuration.

In some examples, the request transmitter 750 may be configured as or otherwise support a means for transmitting, to the controller of the assisting node, a request for the configuration, where receiving the configuration is based on transmitting the request.

In some examples, to support receiving the configuration, the configuration receiver 740 may be configured as or otherwise support a means for receiving a sidelink resource pool configuration, where the sidelink resource pool configuration indicates the set of time resources during which the assisting node is active and the location information that indicates communication direction information corresponding to communications via the assisting node during the set of time resources.

In some examples, receiving the configuration via RRC signaling, medium access control (MAC) control element signaling, sidelink control information signaling, or any combination thereof.

In some examples, the information associated with the packet for transmission from the first UE to the second UE includes at least a location of the second UE, and the communication determiner 745 may be configured as or otherwise support a means for determining to communicate with the second UE via the assisting node based on the location of the second UE, the location of the first UE, and the communication direction information corresponding to communications via the assisting node during the set of time resources.

In some examples, the selecting the time resource from the set of time resources is based on the determining to communicate with the second UE via the assisting node.

In some examples, the set of time resources includes a set of slots during which the assisting node is active. In some examples, the time resource includes one slot of the set of slots.

In some examples, the assisting node includes a reconfigurable surface or a repeater.

Figure 8:
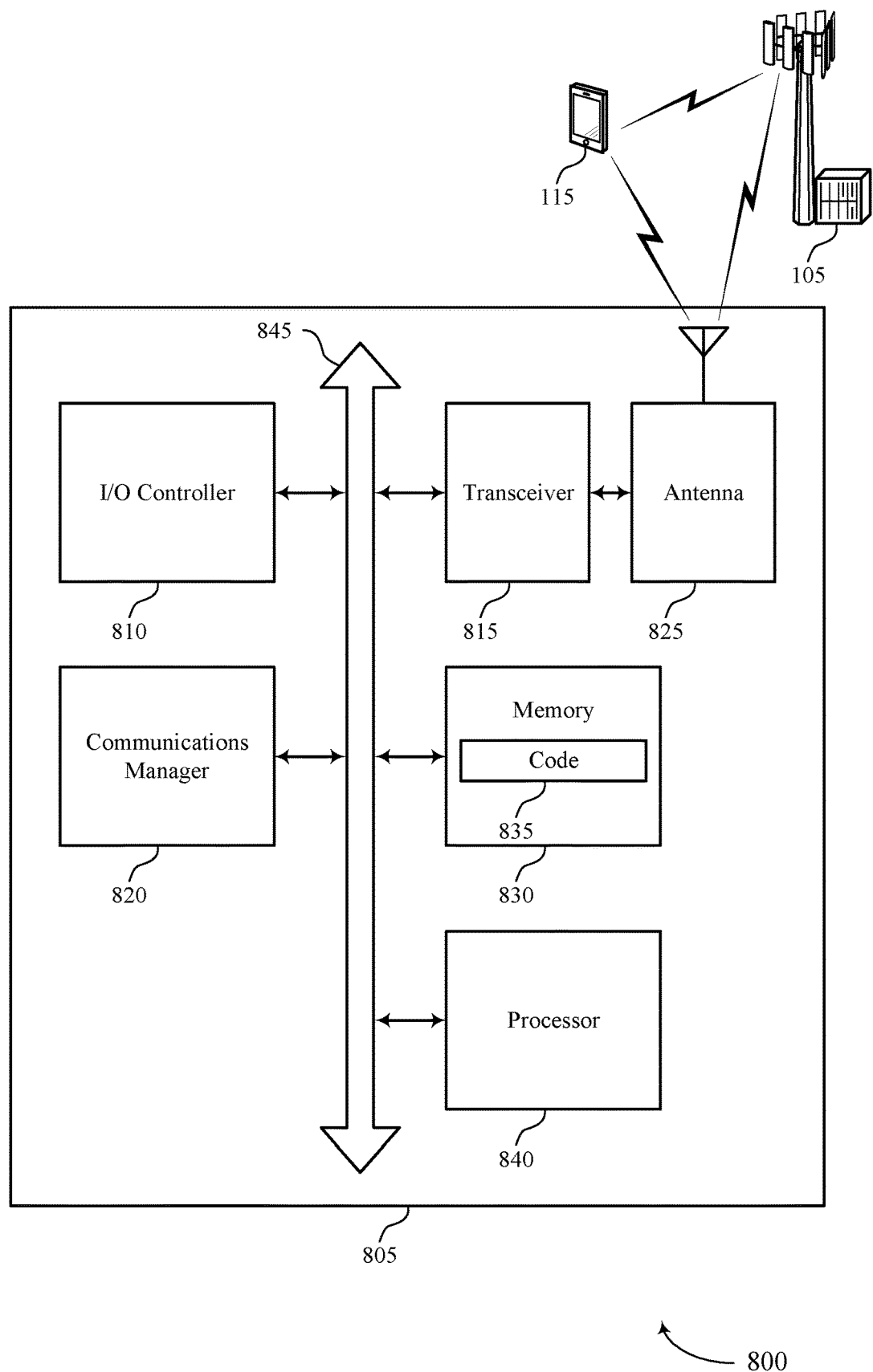
FIG. 8 shows a diagram of a system including a device that supports configuring location information for transmitting packets via assisting nodes in accordance with aspects of the present disclosure.

FIG. 8 shows a diagram of a system 800 including a device 805 that supports configuring location information for transmitting packets via assisting nodes in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting configuring location information for transmitting packets via assisting nodes). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for identifying a configuration for an assisting node that includes an indication of a set of time resources during which the assisting node is active and an indication of location information that indicates communication direction information corresponding to communications via the assisting node during the set of time resources. The communications manager 820 may be configured as or otherwise support a means for selecting a time resource from the set of time resources based on the indication of location information, a location of the first UE, and information associated with a packet for transmission from the first UE to a second UE via the assisting node. The communications manager 820 may be configured as or otherwise support a means for transmitting the packet over the selected time resource.

By including or configuring the communications manager 820 in accordance with examples as described herein, the device 805 may support techniques for identifying which slots an AN is activated and the incoming and outgoing signal directions associated with that slot. The identifying may enable the device 805 to avoid transmitting signals to deactivated ANs, to ANs that have an incoming signal direction unaligned with the device 805, to ANs that have an outgoing signal direction unaligned with a UE to which the device 805 is to transmit, or any combination thereof. Accordingly, the efficiency of communications may improve.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of configuring location information for transmitting packets via assisting nodes as described herein, or the processor 840 and the memory 830 may be otherwise configured to perform or support such operations.

Figure 9:
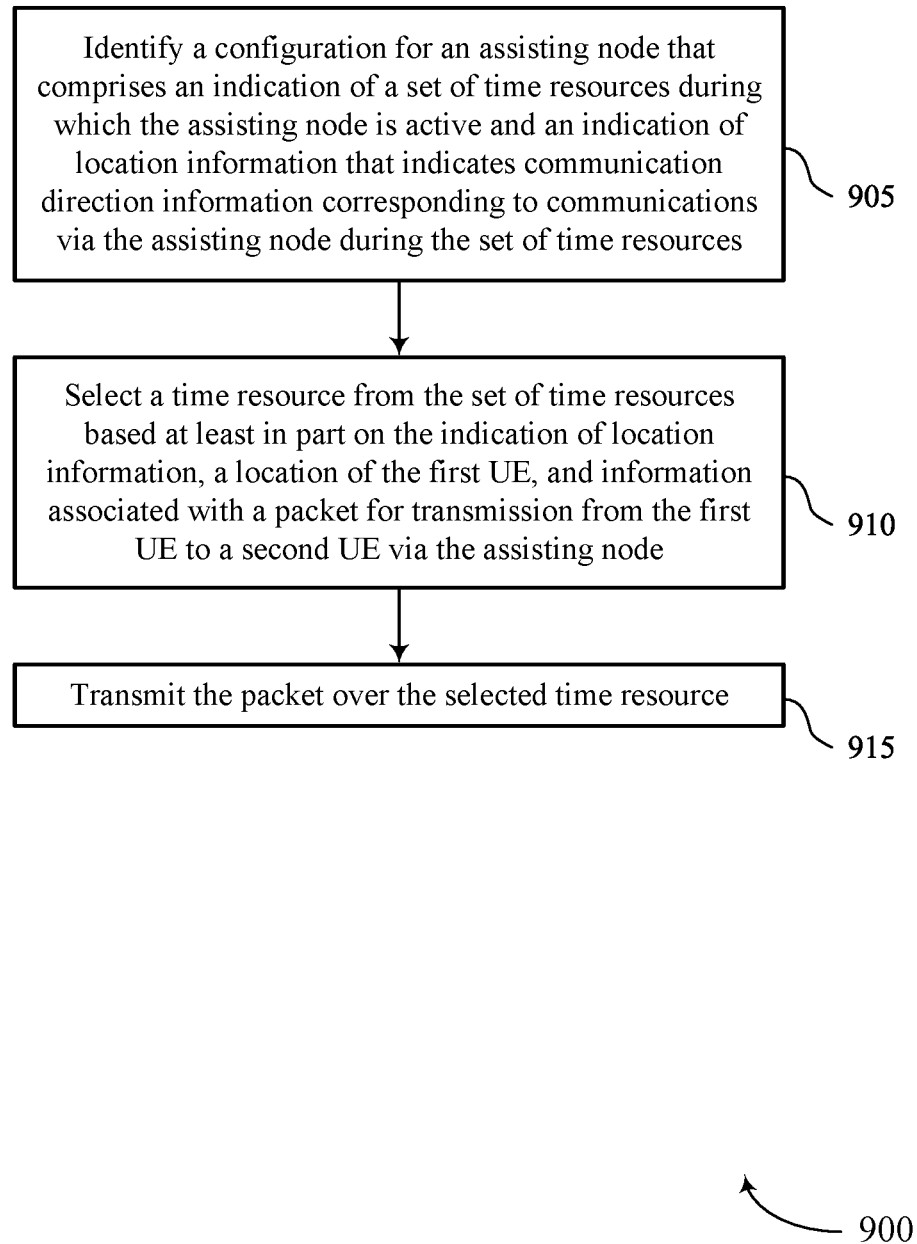
FIGS. 9 through 11 show flowcharts illustrating methods that support configuring location information for transmitting packets via assisting nodes in accordance with aspects of the present disclosure.

FIG. 9 shows a flowchart illustrating a method 900 that supports configuring location information for transmitting packets via assisting nodes in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying a configuration for an assisting node that includes an indication of a set of time resources during which the assisting node is active and an indication of location information that indicates communication direction information corresponding to communications via the assisting node during the set of time resources. The operations of 905 may be performed in accordance with examples as disclosed herein. In some examples, aspects of the operations of 905 may be performed by a configuration identifier 725 as described with reference to FIG. 7.

At 910, the method may include selecting a time resource from the set of time resources based on the indication of location information, a location of the first UE, and information associated with a packet for transmission from the first UE to a second UE via the assisting node. The operations of 910 may be performed in accordance with examples as disclosed herein. In some examples, aspects of the operations of 910 may be performed by a time resource selector 730 as described with reference to FIG. 7.

At 915, the method may include transmitting the packet over the selected time resource. The operations of 915 may be performed in accordance with examples as disclosed herein. In some examples, aspects of the operations of 915 may be performed by a packet transmitter 735 as described with reference to FIG. 7.

Figure 10:
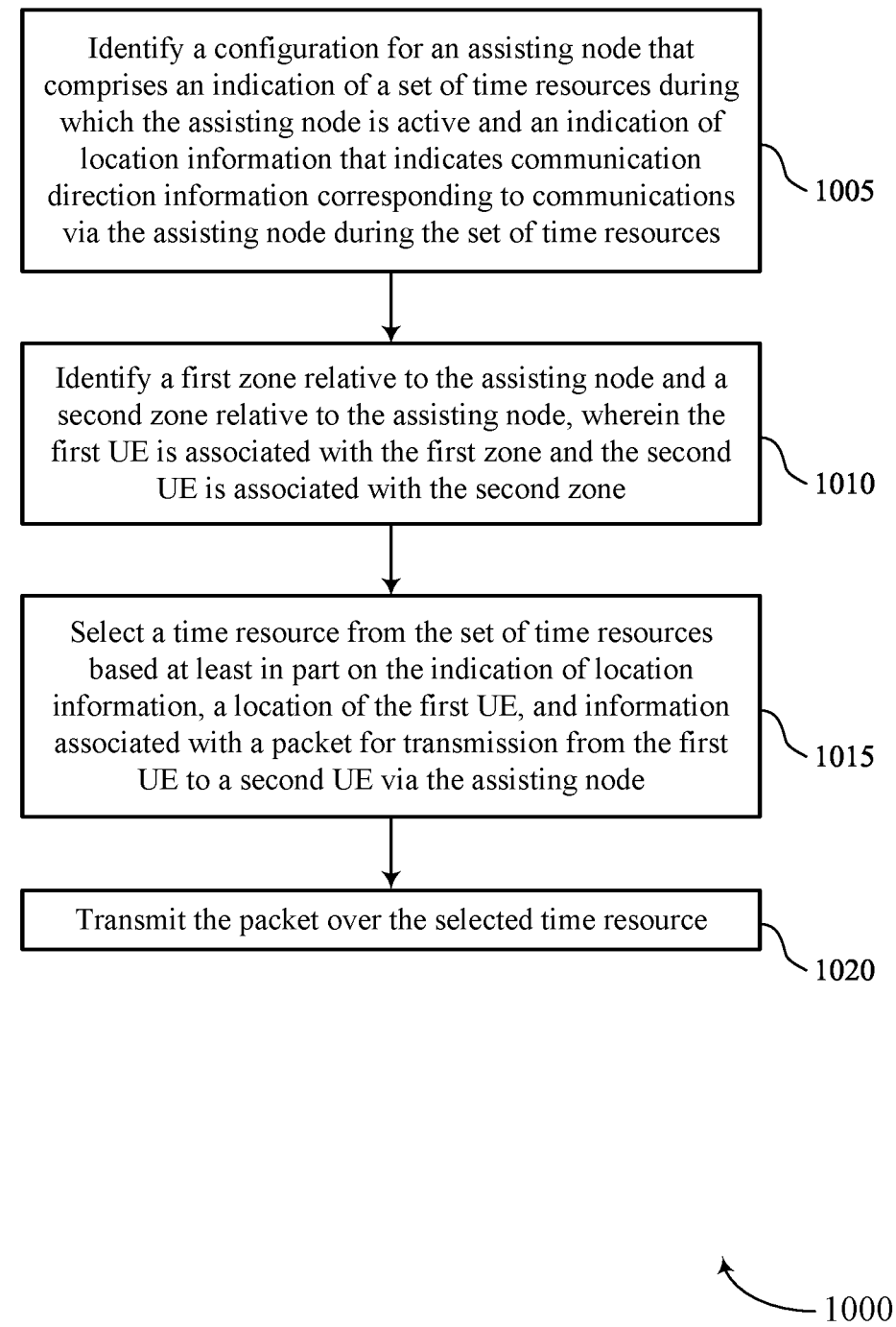

FIG. 10 shows a flowchart illustrating a method 1000 that supports configuring location information for transmitting packets via assisting nodes in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include identifying a configuration for an assisting node that includes an indication of a set of time resources during which the assisting node is active and an indication of location information that indicates communication direction information corresponding to communications via the assisting node during the set of time resources. The operations of 1005 may be performed in accordance with examples as disclosed herein. In some examples, aspects of the operations of 1005 may be performed by a configuration identifier 725 as described with reference to FIG. 7.

At 1010, the method may include identifying a first zone relative to the assisting node and a second zone relative to the assisting node, where the first UE is associated with the first zone and the second UE is associated with the second zone. The operations of 1010 may be performed in accordance with examples as disclosed herein.

In some examples, aspects of the operations of 1010 may be performed by a configuration identifier 725 as described with reference to FIG. 7.

At 1015, the method may include selecting a time resource from the set of time resources based on the indication of location information, a location of the first UE, and information associated with a packet for transmission from the first UE to a second UE via the assisting node. The operations of 1015 may be performed in accordance with examples as disclosed herein. In some examples, aspects of the operations of 1015 may be performed by a time resource selector 730 as described with reference to FIG. 7.

At 1020, the method may include transmitting the packet over the selected time resource. The operations of 1020 may be performed in accordance with examples as disclosed herein. In some examples, aspects of the operations of 1020 may be performed by a packet transmitter 735 as described with reference to FIG. 7.

Figure 11:
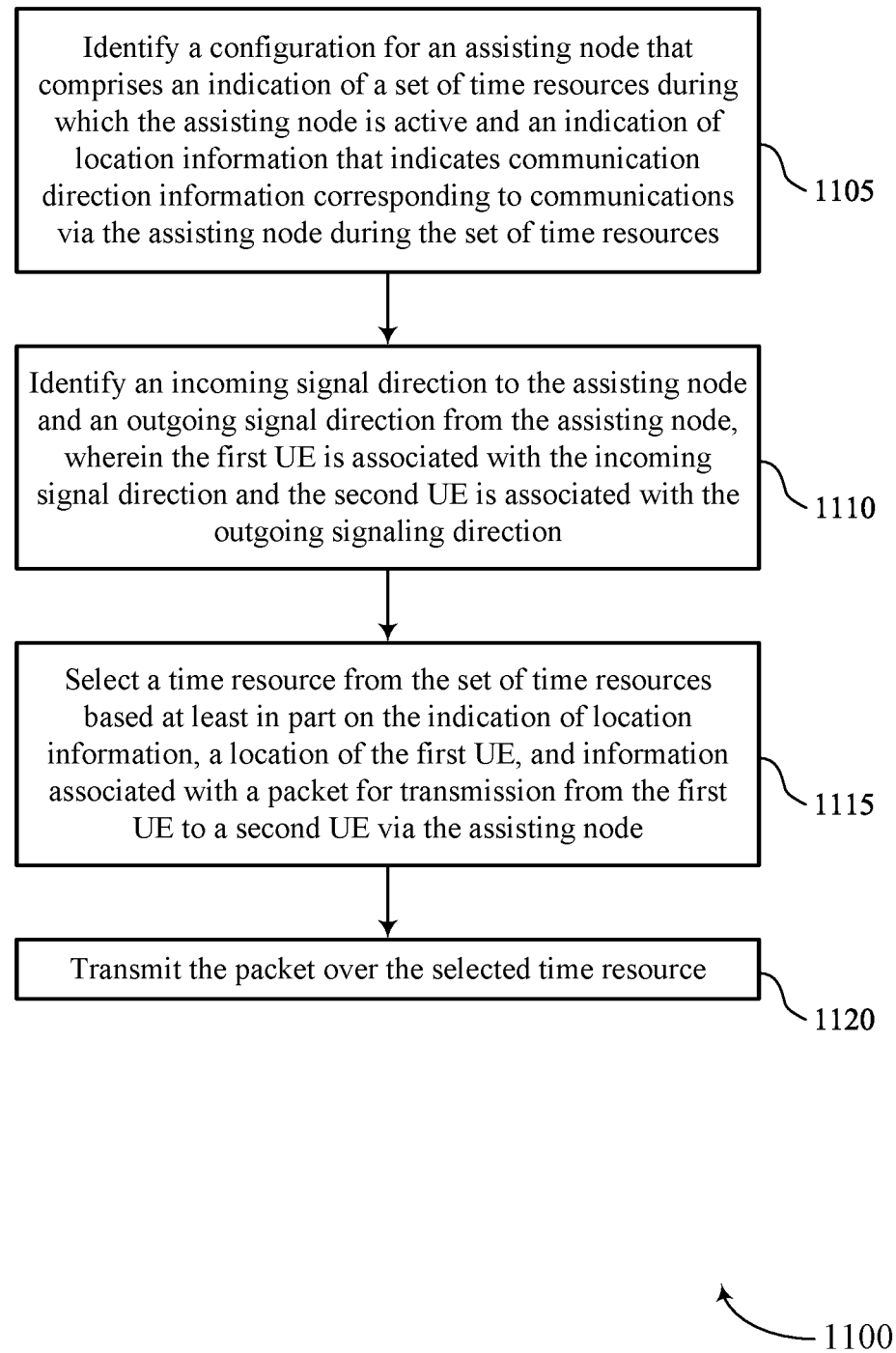

FIG. 11 shows a flowchart illustrating a method 1100 that supports configuring location information for transmitting packets via assisting nodes in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include identifying a configuration for an assisting node that includes an indication of a set of time resources during which the assisting node is active and an indication of location information that indicates communication direction information corresponding to communications via the assisting node during the set of time resources. The operations of 1105 may be performed in accordance with examples as disclosed herein. In some examples, aspects of the operations of 1105 may be performed by a configuration identifier 725 as described with reference to FIG. 7.

At 1110, the method may include identifying an incoming signal direction to the assisting node and an outgoing signal direction from the assisting node, where the first UE is associated with the incoming signal direction and the second UE is associated with the outgoing signaling direction. The operations of 1110 may be performed in accordance with examples as disclosed herein. In some examples, aspects of the operations of 1110 may be performed by a configuration identifier 725 as described with reference to FIG. 7.

At 1115, the method may include selecting a time resource from the set of time resources based on the indication of location information, a location of the first UE, and information associated with a packet for transmission from the first UE to a second UE via the assisting node. The operations of 1115 may be performed in accordance with examples as disclosed herein. In some examples, aspects of the operations of 1115 may be performed by a time resource selector 730 as described with reference to FIG. 7.

At 1120, the method may include transmitting the packet over the selected time resource. The operations of 1120 may be performed in accordance with examples as disclosed herein. In some examples, aspects of the operations of 1120 may be performed by a packet transmitter 735 as described with reference to FIG. 7.

The following provides an overview of aspects of the present disclosure:

Aspect 1: A method for wireless communication at a first UE, comprising: identifying a configuration for an assisting node that comprises an indication of a set of time resources during which the assisting node is active and an indication of location information that indicates communication direction information corresponding to communications via the assisting node during the set of time resources; selecting a time resource from the set of time resources based at least in part on the indication of location information, a location of the first UE, and information associated with a packet for transmission from the first UE to a second UE via the assisting node; and transmitting the packet over the selected time resource.

Aspect 2: The method of aspect 1, wherein identifying the indication of location information comprises: identifying a first zone relative to the assisting node and a second zone relative to the assisting node, wherein the first UE is associated with the first zone and the second UE is associated with the second zone.

Aspect 3: The method of any of aspects 1 through 2, wherein identifying the indication of location information comprises: identifying an incoming signal direction to the assisting node and an outgoing signal direction from the assisting node, wherein the first UE is associated with the incoming signal direction and the second UE is associated with the outgoing signaling direction.

Aspect 4: The method of any of aspects 1 through 3, wherein identifying the indication of location information comprises: identifying a first pair of incoming and outgoing signal directions associated with the assisting node corresponding to a first subset of time resources of the set of time resources; and identifying a second pair of incoming and outgoing signal directions associated with the assisting node corresponding to a second subset of time resources of the set of time resources.

Aspect 5: The method of aspect 4, wherein selecting the time resource from the set of time resources comprises: selecting between the first subset of time resources and the second subset of time resources based at least in part on the information associated with the packet for transmission from the first UE to the second UE, the first pair of incoming and outgoing signal directions, and the second pair of incoming and outgoing signal directions.

Aspect 6: The method of any of aspects 1 through 5, further comprising: receiving the configuration from a controller of the assisting node, wherein identifying the configuration is based at least in part on receiving the configuration.

Aspect 7: The method of aspect 6, further comprising: transmitting, to the controller of the assisting node, a request for the configuration, wherein receiving the configuration is based at least in part on transmitting the request.

Aspect 8: The method of any of aspects 6 through 7, wherein receiving the configuration comprises: receiving a sidelink resource pool configuration, wherein the sidelink resource pool configuration indicates the set of time resources during which the assisting node is active and the location information that indicates communication direction information corresponding to communications via the assisting node during the set of time resources.

Aspect 9: The method of any of aspects 6 through 8, wherein receiving the configuration via RRC signaling, medium access control (MAC) control element signaling, sidelink control information signaling, or any combination thereof.

Aspect 10: The method of any of aspects 1 through 9, wherein the information associated with the packet for transmission from the first UE to the second UE comprises at least a location of the second UE, the method further comprising: determining to communicate with the second UE via the assisting node based at least in part on the location of the second UE, the location of the first UE, and the communication direction information corresponding to communications via the assisting node during the set of time resources.

Aspect 11: The method of aspect 10, wherein the selecting the time resource from the set of time resources is based at least in part on the determining to communicate with the second UE via the assisting node.

Aspect 12: The method of any of aspects 1 through 11, wherein the set of time resources comprises a set of slots during which the assisting node is active, and the time resource comprises one slot of the set of slots Aspect 13: The method of any of aspects 1 through 12, wherein the assisting node comprises a reconfigurable surface or a repeater.

Aspect 14: An apparatus for wireless communication at a first UE, comprising a processor; memory coupled with the processor; and instructions stored in the memory and executable by the processor to cause the apparatus to perform a method of any of aspects 1 through 13.

Aspect 15: An apparatus for wireless communication at a first UE, comprising at least one means for performing a method of any of aspects 1 through 13.

Aspect 16: A non-transitory computer-readable medium storing code for wireless communication at a first UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
receiving, from a controller of an assisting node, a configuration for the assisting node, wherein the configuration comprises an indication of a set of time resources during which the assisting node is active;
identifying, by the first UE, an indication of location information that indicates communication direction information corresponding to communications via the assisting node during the set of time resources;
selecting a time resource from the set of time resources based at least in part on the indication of location information, a location of the first UE, and information associated with a packet for transmission from the first UE to a second UE via the assisting node, wherein the information associated with the packet for transmission from the first UE to the second UE comprises at least a location of the second UE;
determining to communicate with the second UE via the assisting node based at least in part on the location of the second UE, the location of the first UE, and the communication direction information corresponding to communications via the assisting node during the set of time resources; and
transmitting the packet over the selected time resource.

2. The method of claim 1, wherein identifying the indication of location information comprises:
identifying a first zone relative to the assisting node and a second zone relative to the assisting node, wherein the first UE is associated with the first zone and the second UE is associated with the second zone.

3. The method of claim 1, wherein identifying the indication of location information comprises:
identifying an incoming signal direction to the assisting node and an outgoing signal direction from the assisting node, wherein the first UE is associated with the incoming signal direction and the second UE is associated with the outgoing signal direction.

4. The method of claim 1, wherein identifying the indication of location information comprises:
identifying a first pair of incoming and outgoing signal directions associated with the assisting node corresponding to a first subset of time resources of the set of time resources; and
identifying a second pair of incoming and outgoing signal directions associated with the assisting node corresponding to a second subset of time resources of the set of time resources.

5. The method of claim 4, wherein selecting the time resource from the set of time resources comprises:
selecting between the first subset of time resources and the second subset of time resources based at least in part on the information associated with the packet for transmission from the first UE to the second UE, the first pair of incoming and outgoing signal directions, and the second pair of incoming and outgoing signal directions.

6. The method of claim 1, further comprising:
identifying the configuration based at least in part on receiving the configuration.

7. The method of claim 6, further comprising:
transmitting, to the controller of the assisting node, a request for the configuration, wherein receiving the configuration is based at least in part on transmitting the request.

8. The method of claim 6, wherein receiving the configuration comprises:
receiving a sidelink resource pool configuration, wherein the sidelink resource pool configuration indicates the set of time resources during which the assisting node is active and the location information that indicates the communication direction information corresponding to communications via the assisting node during the set of time resources.

9. The method of claim 6, wherein receiving the configuration comprises receiving the configuration via radio resource control (RRC) signaling, medium access control (MAC) control element signaling, sidelink control information signaling, or any combination thereof.

10. The method of claim 1, wherein selecting the time resource from the set of time resources is based at least in part on the determining to communicate with the second UE via the assisting node.

11. The method of claim 1, wherein:
the set of time resources comprises a set of slots during which the assisting node is active, and
the time resource comprises one slot of the set of slots.

12. The method of claim 1, wherein the assisting node comprises a reconfigurable surface or a repeater.

13. An apparatus for wireless communication at a first user equipment (UE), comprising:
one or more processors;
memory coupled with the one or more processors; and
instructions stored in the memory and executable by the processor to cause the apparatus to:
receive, from a controller of an assisting node, a configuration for the assisting node, wherein the configuration comprises an indication of a set of time resources during which the assisting node is active;
identify, by the first UE, an indication of location information that indicates communication direction information corresponding to communications via the assisting node during the set of time resources;
select a time resource from the set of time resources based at least in part on the indication of location information, a location of the first UE, and information associated with a packet for transmission from the first UE to a second UE via the assisting node, wherein the information associated with the packet for transmission from the first UE to the second UE comprises at least a location of the second UE;
determine to communicate with the second UE via the assisting node based at least in part on the location of the second UE, the location of the first UE, and the communication direction information corresponding to communications via the assisting node during the set of time resources; and
transmit the packet over the selected time resource.

14. The apparatus of claim 13, wherein the instructions to identify the indication of location information are executable by the one or more processors to cause the apparatus to:
identify a first zone relative to the assisting node and a second zone relative to the assisting node, wherein the first UE is associated with the first zone and the second UE is associated with the second zone.

15. The apparatus of claim 13, wherein the instructions to identify the indication of location information are executable by the one or more processors to cause the apparatus to:
identify an incoming signal direction to the assisting node and an outgoing signal direction from the assisting node, wherein the first UE is associated with the incoming signal direction and the second UE is associated with the outgoing signal direction.

16. The apparatus of claim 13, wherein the instructions to identify the indication of location information are executable by the one or more processors to cause the apparatus to:
identify a first pair of incoming and outgoing signal directions associated with the assisting node corresponding to a first subset of time resources of the set of time resources; and
identify a second pair of incoming and outgoing signal directions associated with the assisting node corresponding to a second subset of time resources of the set of time resources.

17. The apparatus of claim 16, wherein the instructions to select the time resource from the set of time resources are executable by the one or more processors to cause the apparatus to:
select between the first subset of time resources and the second subset of time resources based at least in part on the information associated with the packet for transmission from the first UE to the second UE, the first pair of incoming and outgoing signal directions, and the second pair of incoming and outgoing signal directions.

18. The apparatus of claim 13, wherein the instructions are further executable by the one or more processors to cause the apparatus to:
identify the configuration based at least in part on receiving the configuration.

19. The apparatus of claim 18, wherein the instructions are further executable by the one or more processors to cause the apparatus to:
transmit, to the controller of the assisting node, a request for the configuration, wherein receiving the configuration is based at least in part on transmitting the request.

20. The apparatus of claim 18, wherein the instructions to receive the configuration are executable by the one or more processors to cause the apparatus to:
receive a sidelink resource pool configuration, wherein the sidelink resource pool configuration indicates the set of time resources during which the assisting node is active and the location information that indicates the communication direction information corresponding to communications via the assisting node during the set of time resources.

21. The apparatus of claim 18, wherein the instructions to receive the configuration are executable by the one or more processors to cause the apparatus to:
receive the configuration via radio resource control (RRC) signaling, medium access control (MAC) control element signaling, sidelink control information signaling, or any combination thereof.

22. The apparatus of claim 13, wherein:
the set of time resources comprises a set of slots during which the assisting node is active, and
the time resource comprises one slot of the set of slots.

23. The apparatus of claim 13, wherein the assisting node comprises a reconfigurable surface or a repeater.

24. An apparatus for wireless communication at a first user equipment (UE), comprising:
means for receiving, from a controller of an assisting node, a configuration for the assisting node, wherein the configuration comprises an indication of a set of time resources during which the assisting node is active;
means for identifying, by the first UE, an indication of location information that indicates communication direction information corresponding to communications via the assisting node during the set of time resources;
means for selecting a time resource from the set of time resources based at least in part on the indication of location information, a location of the first UE, and information associated with a packet for transmission from the first UE to a second UE via the assisting node, wherein the information associated with the packet for transmission from the first UE to the second UE comprises at least a location of the second UE;
means for determining to communicate with the second UE via the assisting node based at least in part on the location of the second UE, the location of the first UE, and the communication direction information corresponding to communications via the assisting node during the set of time resources; and
means for transmitting the packet over the selected time resource.

25. The apparatus of claim 24, wherein the means for identifying the indication of location information comprise:
means for identifying a first zone relative to the assisting node and a second zone relative to the assisting node, wherein the first UE is associated with the first zone and the second UE is associated with the second zone.

26. A non-transitory computer-readable medium storing code for wireless communication at a first user equipment (UE), the code comprising instructions executable by one or more processors to:
receive, from a controller of an assisting node, a configuration for the assisting node, wherein the configuration comprises an indication of a set of time resources during which the assisting node is active;
identify, by the first UE, an indication of location information that indicates communication direction information corresponding to communications via the assisting node during the set of time resources;
select a time resource from the set of time resources based at least in part on the indication of location information, a location of the first UE, and information associated with a packet for transmission from the first UE to a second UE via the assisting node, wherein the information associated with the packet for transmission from the first UE to the second UE comprises at least a location of the second UE;
determine to communicate with the second UE via the assisting node based at least in part on the location of the second UE, the location of the first UE, and the communication direction information corresponding to communications via the assisting node during the set of time resources; and
transmit the packet over the selected time resource.

27. The non-transitory computer-readable medium of claim 16, wherein the instructions to identify the indication of location information are executable by the one or more processors to:
    identify a first zone relative to the assisting node and a second zone relative to the assisting node, wherein the first UE is associated with the first zone and the second UE is associated with the second zone.

\* \* \* \* \*